United States Patent
Vivian et al.

(10) Patent No.: US 9,200,752 B2
(45) Date of Patent: Dec. 1, 2015

(54) VALVE ELEMENT FOR A CONDENSATE TRAP

(75) Inventors: Tom Vivian, Gloucestershire (GB); Brian Chu, Gloucestershire (GB)

(73) Assignee: Spirax-Sarco Limited, Gloucestershire (GB)

( * ) Notice: Subject to any disclaimer, the term of this patent is extended or adjusted under 35 U.S.C. 154(b) by 1008 days.

(21) Appl. No.: 12/898,336

(22) Filed: Oct. 5, 2010

(65) Prior Publication Data
US 2011/0084222 A1    Apr. 14, 2011

(30) Foreign Application Priority Data
Oct. 6, 2009    (GB) .................................. 0917451.7

(51) Int. Cl.
| F16T 1/48 | (2006.01) |
| F16T 1/36 | (2006.01) |
| F16T 1/38 | (2006.01) |
| F16T 1/10 | (2006.01) |
| F16T 1/04 | (2006.01) |
| F16T 1/06 | (2006.01) |
| F16T 1/14 | (2006.01) |

(52) U.S. Cl.
CPC ........................................ *F16T 1/14* (2013.01)

(58) Field of Classification Search
CPC ... F16K 31/1262; F16K 31/126; F16K 1/221; F16K 3/10; F16K 7/17; F16K 7/10; F16K 99/0001; F04B 49/243; F15C 3/04; F16T 1/48; F16T 1/36; F16T 1/38; F16T 1/00; F16T 1/10; F16T 1/02; F16T 1/04; F16T 1/06; F16T 1/16
USPC ....... 62/55–59, 93 A, 93 R, 99 R; 251/77, 86, 251/377, 61.1; 236/56, 58, 59, 93 R, 99 R
See application file for complete search history.

(56) References Cited

U.S. PATENT DOCUMENTS

| 1,792,891 | A | * | 2/1931 | Clifford | ........................ 236/99 R |
| 3,146,948 | A | * | 9/1964 | Payne | ........................ 236/93 R |
| 4,560,105 | A | | 12/1985 | Jiandani | |
| 4,616,778 | A | * | 10/1986 | Thieme | ........................... 236/58 |
| 4,679,727 | A | * | 7/1987 | Alesson | ........................... 236/56 |
| 4,723,704 | A | * | 2/1988 | Muramoto | ....................... 236/59 |
| 5,833,135 | A | * | 11/1998 | Yumoto | ........................... 236/58 |

FOREIGN PATENT DOCUMENTS

| GB | 2 059 047 A | 4/1981 |
| GB | 2 085 553 A | 4/1982 |

OTHER PUBLICATIONS

Search Report in related British Patent Application No. GB 0917451.7 dated Nov. 10, 2009.

* cited by examiner

*Primary Examiner* — Mohammad M Ali
*Assistant Examiner* — Meraj A Shaikh
(74) *Attorney, Agent, or Firm* — Banner & Witcoff, Ltd.

(57) ABSTRACT

There is provided a valve element for a condensate trap comprising an expansion chamber in the form of a metallic bellows having a variable axial length and having first and second ends sealed with first and second end caps respectively. A valve closure member is provided on the second end cap and is arranged to cooperate with a valve seat. A first guide member is coupled to the first end cap and axially extends into the bellows and a second guide member is coupled to the second end cap, axially extends into the bellows and cooperates with the first guide member. This allows relative axial movement between the first and second end caps but restricts relative radial movement between the first and second end caps. This helps to ensure that the valve closure member properly seats on the valve seal.

20 Claims, 4 Drawing Sheets

VALVE ELEMENT FOR A CONDENSATE TRAP

CROSS-REFERENCE TO RELATED APPLICATIONS

Figure 1:
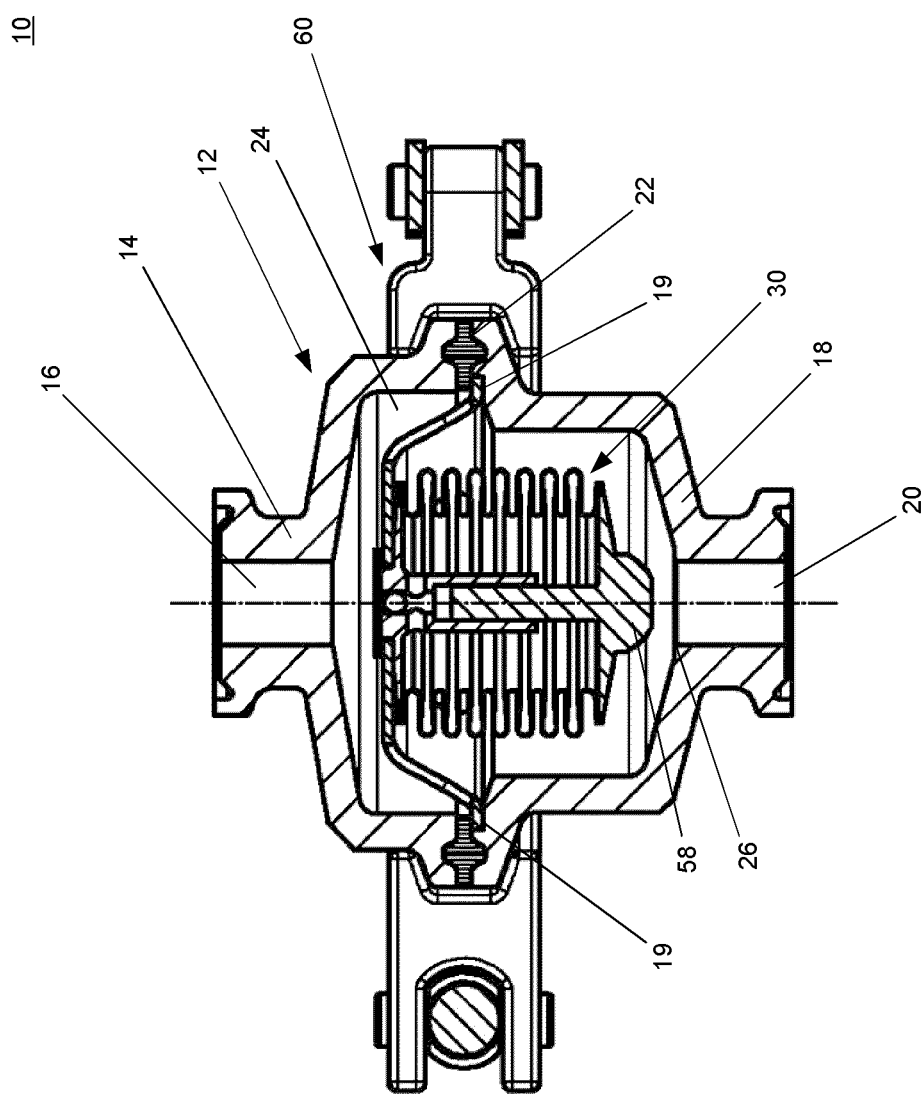

The present application claims priority to GB 0917451.7 filed on 6 Oct. 2009, which is hereby incorporated by reference in its entirety for any and all purposes.

BACKGROUND

Aspects of the invention relate to a valve element for a condensate trap, in particular, a valve element comprising an expansion chamber having a variable axial length.

Condensate traps are commonly used in steam systems, in which circumstances they are usually referred to as steam traps. Their function is to discharge condensed water from the system without allowing steam to escape. If steam is lost from the system, this represents a waste of energy. Steam traps thus commonly comprise a valve which is responsive to the presence of condensate or steam in the vicinity of the valve, so that the valve opens when condensate is present and closes when steam is present.

One type of steam trap, known as a balanced pressure steam trap, comprises a valve body having an inlet and an outlet which are in fluid communication with a valve body chamber. Located within the valve body chamber is a valve element which includes a metal bellows having a valve closure member which cooperates with a valve seat to open and close the valve. The metal bellows is deformable in the axial direction (i.e. the valve opening and closing direction) and has a bellows cavity which is filled with a fluid/gas mixture. When the temperature of the bellows is cooled by condensate, the volume of the fluid/gas mixture reduces and the bellows axially contracts, moving the valve closure member away from the valve seat and allowing the condensate to exit through the outlet. When the condensate has been discharged, the steam enters the valve body chamber and increases the temperature of the bellows. This causes the fluid/gas mixture to expand and the bellows axially expands, thus pressing the valve closure member against the valve seat and preventing steam from leaving the system through the outlet.

The metal bellows of a known steam trap is made from a number of metal disks which are plasma welded to one another. Whilst this produces a satisfactory component, the manufacturing procedure is time consuming. Further, the metal bellows has many small crevices within which bacteria can grow, and which are difficult to clean. This makes the steam trap unsuitable for some applications where hygiene is particularly important.

Metal bellows are known which are made from a single piece of material by deforming the material to produce corrugations which provide the bellows configuration. Such bellows lack rigidity in the radial direction, and consequently have not been considered suitable for steam trap applications, in which precise alignment of the valve closure member with the valve seat is required.

Accordingly, embodiments of the invention aim to address at least some of the above problems to some extent.

SUMMARY

The following presents a general summary of aspects of the invention in order to provide a basic understanding of the invention and various features of it. This summary is not intended to limit the scope of the invention in any way, but it simply provides a general overview and context for a more detailed description of various embodiments that follows.

According to an aspect of the invention there is provided a valve element for a condensate trap comprising: an expansion chamber having a variable axial length and having first and second ends sealed with first and second end caps respectively; a valve closure member on the second end cap; a first guide member coupled to the first end cap and axially extending into the expansion chamber; a second guide member coupled to the second end cap, axially extending into the expansion chamber and cooperating with the first guide member to allow relative axial movement between the first and second end caps but to restrict relative radial movement between the first and second end caps.

The expansion chamber may be a metal bellows. The metal bellows may be preformed from a single piece of material.

The first and second guide members may be a rod and a corresponding sleeve within which the rod is located and can axially slide. The sleeve may be coupled to the first end cap and the rod may be coupled to the second end cap.

The valve element may further comprise a fluid passageway extending from outside the expansion chamber to inside the expansion chamber which arranged for filling the expansion chamber with fluid during manufacture, wherein the fluid passageway is sealed to prevent fluid exiting the expansion chamber. The fluid passageway may be sealed by a plug fitted into the fluid passageway. The fluid passageway may be at least partially sealed using a sealing cap fitted over the end of the fluid passageway. The fluid passageway may open into the interior of the sleeve.

The valve element may further comprise a mounting member coupled to the valve element for mounting the valve element in a valve body. The valve element may be pivotable with respect to the mounting member.

Aspects of the invention also concern a condensate trap comprising a valve element in accordance with any statement herein.

The invention may comprise any combination of the features and/or limitations referred to herein, except combinations of such features as are mutually exclusive.

Figure 2:
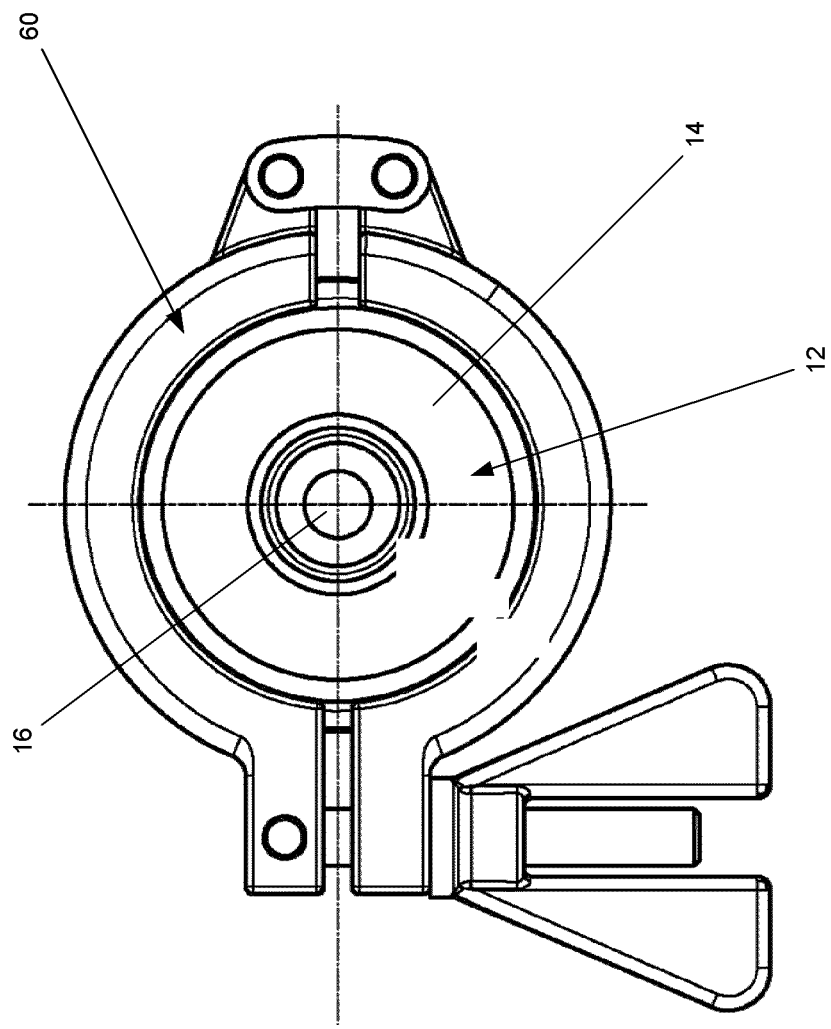
Figure 3:
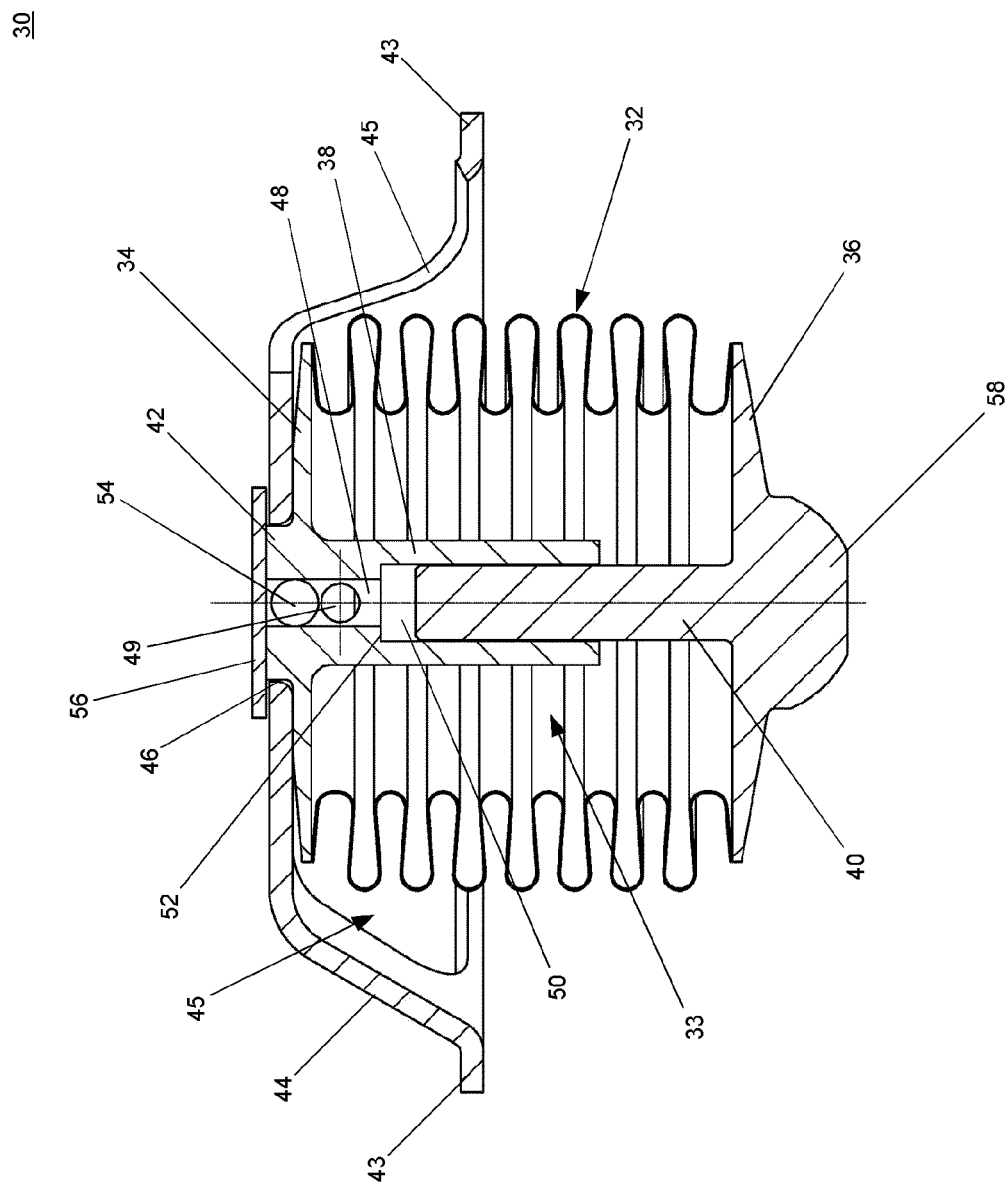

Embodiments of the invention will now be described, by way of example only, with reference to the accompanying drawings, in which:

FIG. 1 schematically show a cross-sectional view of a steam trap according to an embodiment of the invention;

FIG. 2 schematically shows a plan view of the steam trap of FIG. 1;

FIG. 3 schematically shows the valve element of FIG. 1; and

Figure 4:
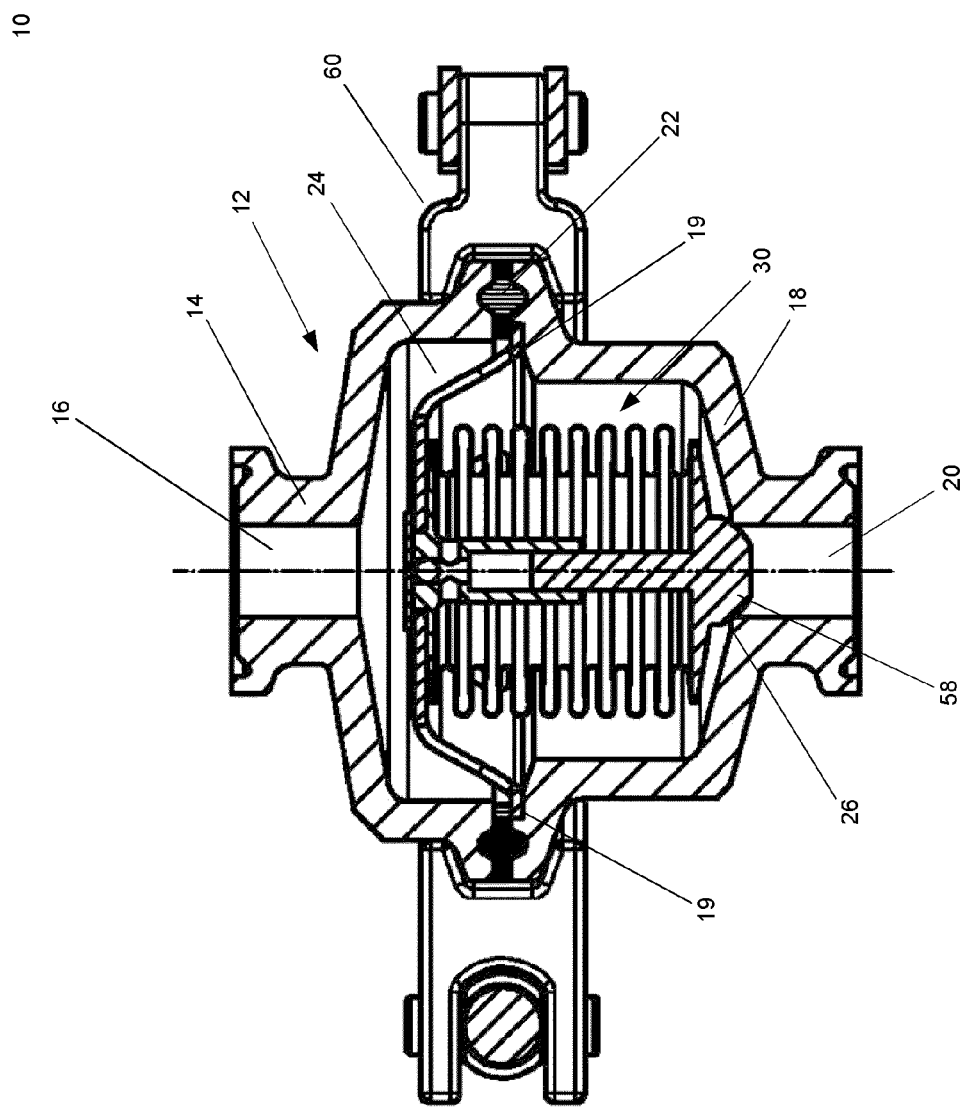

FIG. 4 schematically shows the steam trap of FIG. 1 with the valve in the closed position.

FIGS. 1 and 2 show a balanced pressure steam trap 10 including a valve. The steam strap 10 comprises a valve body 12, a valve element 30 and a clamp 60.

The valve body 12 comprises a first upper part 14 having an inlet 16 and a second lower part 18 having an outlet 20. An annular seal 22 is located between the first and second parts 14, 18 which are held together by the clamp 60. The valve body 12 defines a valve chamber 24 which is in fluid communication with the inlet and the outlet 16, 20. The second part 18 also comprises a valve seat 26 in the vicinity of the outlet 20.

FIG. 3 shows the valve element 30 outside of the valve body 12. The valve element 30 comprises a pre-formed metal bellows 32 that is deformable, and therefore has a variable length, in the axial direction. The bellows 32 is formed from a tubular element which is deformed to produce an axially extending series of circumferential corrugations. The corrugations have a radiussed profile, making them easy to clean. A first upper end cap 34 seals a first upper end of the bellows 32 and a second lower end cap 36 seals a second lower end of the bellows 32, thereby defining a bellows cavity 33. The bellows cavity 33 is filled with a liquid and/or gas mixture. The upper end cap 34 has a first axially extending guide member 38 that extends into the bellows 32 and the lower end cap 36 has a second axially extending guide member 40 that extends into the bellows 32. An axially extending mounting projection 42 is provided on the first end cap 34 and is located within an opening 46 in a mounting member 44. The mounting member 44 comprises an annular flange 43 and a number of fluid passageways 45. The diameter of the opening 46 in the mounting member 44 is larger than the diameter of the mounting projection. Further, the thickness of the mounting member 44 is less than the length of the mounting projection 42. This allows a small amount of movement between the mounting member 42 and the bellows 32.

A bore axially extends through the mounting projection 42, upper end cap 34 and first guide member 38. The bore comprises a first bore 48 of a first diameter extending through the mounting projection 42, upper end cap 34 and a portion of the length of the first guide member 38, and a second bore 50 of a second larger diameter extending along the remaining portion of the first guide member 38. The change in diameter between the first and second bores 48, 50 results in an annular shoulder 52. The end of the first bore 38 is sealed using a ball 54, which is pressed fitted in, and a sealing cap 56 which is welded onto the mounting projection 42. The sealing cap 56 has an external diameter that is larger than that of the opening 46 in the mounting member 44 and therefore retains the bellows assembly on the mounting member 44. However, because the length of the mounting projection 42 is greater than the thickness of the mounting member 44, there is free play in the connection between the mounting member 44 and the bellows 32, enabling the bellows 32 to pivot to a small extent relatively to the mounting member 44. The first bore 48 is further provided with two fluid passageways 49, in the form of two bores, that extend in the radial direction in opposite directions from one another. These passageways provide fluid communication between the first bore 48 and the bellows cavity 33.

The second guide member 40 is in the form of a rod and is located within the second bore 50 of the first guide member 38, which is in the form of a sleeve. The outer diameter of the second guide member 40 is slightly smaller than the internal diameter of the second bore 50 and therefore the first and second guide members 38, 40 can slide axially, but not radially, with respect to one another. This in turn allows the first and second end caps 34, 36 to move axially, but not radially, with respect to one another.

The lower end cap 36 is provided with a valve closure member 58, which in use cooperates with the valve seat 26 to open and close the valve. The operation of this will be described in more detail below.

The valve element 30 is manufactured by laser welding the first and second end caps 34, 36 onto the first and second ends of the metal bellows 32, ensuring that the second guide member 40 is located within the second bore 50 of the first guide member 38. The bellows 32 is then compressed in the axial direction so that the second guide member 40 abuts the annular shoulder 52. The bellows cavity 33 is then filled with a known quantity of liquid. This may be done by injecting a known quantity of liquid into the first bore 48, which enters the bellows cavity 33 via the fluid passageways 49, or by completely filling the bellows cavity 33 with liquid and then removing a known quantity of liquid, to be replaced by air. In a particularly preferred embodiment, the fluid passageways 49 are positioned such that when liquid is injected into the first bore 48 the bellows cavity 33 fills up leaving a gas pocket in the bellows cavity 33 above the top of the fluid passageway. Appropriate positioning of the fluid passageways 49 ensure that the size of the gas pocket in the bellows cavity 33 provides a suitable gas to liquid ratio for operation.

Once the bellows cavity 33 has been appropriately filled with fluid, the ball 54 is inserted into the top of the first bore 48. The ball 54 is force fitted into the first bore 48 and provides a hermetic seal. The mounting projection 42 is located in the opening 46 in the mounting member 44 and the sealing cap 56 is laser welded to the top of the mounting projection 42. The ball 54 prevents fluid from evaporating during welding of the sealing cap 56. This results in a good weld.

The assembly of the bellows 32 and the end caps 34, 36 can be manufactured with ease and at speed when compared to the prior art. This is because the bellows 32 is pre-formed and it is therefore not necessary to edge weld a number of metal disks together.

The valve element 30 may either be retrofitted into the valve body 12 of an existing steam trap 10, to replace a previous valve element of a different kind, or a new steam trap 10 can be supplied with the valve element 30 already installed. The process for installing the valve element 30 is as follows. The upper and lower valve body parts 14, 18 are separated and the valve element 30 is positioned on the lower part 18 with the annular flange 43 resting against an annular surface 19 of the lower part 18. The upper part 14 is then placed on top of the lower part 18 with the annular disposed therebetween. The clamp 60 is then clamped around the upper and lower parts 14, 18 in order to hold them together.

The steam trap 10 is typically provided at a lower region of a steam system. During normal operation the steam trap 10 is in the operative condition shown in FIG. 4. In this configuration the valve closure member 58 is in intimate contact with the valve seat 26 and therefore there is no fluid flow through the valve. Condensate that has collected in the system will flow through pipework (not shown) into the inlet 16 and will collect in the chamber 24. The temperature of the condensate causes the temperature of the fluid/gas mixture in the bellows cavity 33 to reduce which causes the volume of the bellows cavity 33 to reduce. This reduction in internal volume causes the valve closure member 58 to move axially away from the valve seat 26. As a result, the condensate is able to flow through the outlet 20. Once all of the condensate has been discharged through the outlet 20, steam will enter the chamber 24 and the temperature of the fluid/gas mixture in the bellows cavity 33 will increase which in turn causes the volume within the bellows cavity 33 to increase, thus pressing the valve closure member 58 against the valve seat 26. This closes the valve and prevents the passage of steam through the outlet 20.

The cooperation of the first and second guide members 38, 40 ensures that the valve closure member 58 can only move in the axial direction with respect to the first end cap 34. This is because the first and second guide members 38, 40 prevent the bellows 32 from bending along its length. This ensures that the valve closure member 58 seats properly on the valve seat 26 to ensure a fluid tight seal. The small amount of clearance at the connection between the bellows 32 and the mounting member 44 enables the bellows 32 to pivot to allow for manufacturing and assembly tolerances, and ensures that the valve closure member 58 seats properly on the valve seat 26 to ensure a fluid tight seal. For example, if the valve closure member 58 is slightly misaligned with the valve seat 26, when the valve closure member 58 contacts the valve seat 26 the tapered nature of the closure member 58 causes it to 'self-seat' by moving radially, and aligning itself with the valve seat 26.

The use of pre-formed bellows 32 results in a steam trap 10 having fewer crevices than prior art steam traps which use a bellows 32 formed by welding a number of metal disks together. This makes the steam trap 10 according to the above embodiment particularly suitable for applications where hygiene is particularly important. This is because there are fewer crevices within which bacteria may be trapped and grow.

The invention claimed is:

1. A valve element assembly for a condensate trap, the valve element assembly comprising:
   a valve element installable in a valve body of the condensate trap, the valve element comprising:
      a sealed expansion chamber containing a fixed amount of fluid and having a variable axial length and configured to axially expand or contract in response to a change of the volume of fluid within the sealed expansion chamber, the sealed expansion chamber comprising first and second ends sealed with first and second end caps respectively;
      a valve closure member on the second end cap for sealing with a valve seat of the condensate trap;
      a first guide member coupled to the first end cap and axially extending into the sealed expansion chamber; and
      a second guide member coupled to the second end cap, axially extending into the sealed expansion chamber and cooperating with the first guide member within the sealed expansion chamber to allow relative axial movement between the first and second end caps but to restrict relative radial movement between the first and second end caps; and
   a mounting member for mounting the valve element in a valve body of the condensate trap;
   wherein the valve element is pivotable with respect to the mounting member.

2. A valve element according to claim 1, wherein the expansion chamber comprises a metal bellows.

3. A valve element according to claim 2, wherein the metal bellows is preformed from a single piece of material.

4. A valve element according to claim 1, wherein the first and second guide members comprise a rod and a corresponding sleeve within which the rod is located and can axially slide.

5. A valve element according to claim 4, wherein the sleeve is coupled to the first end cap and the rod is coupled to the second end cap.

6. A valve element according to claim 1, further comprising a fluid passageway extending from outside the expansion chamber to inside the expansion chamber and arranged for filling the expansion chamber with fluid during manufacture, wherein the fluid passageway is sealed to prevent fluid exiting the expansion chamber.

7. A valve element according to claim 6, wherein the fluid passageway is sealed by a plug fitted into the fluid passageway.

8. A valve element according to claim 6, wherein the fluid passageway is at least partially sealed using a sealing cap fitted over the end of the fluid passageway.

9. A valve element according to claim 4, further comprising:
   a fluid passageway extending from outside the expansion chamber to inside the expansion chamber and arranged for filling the expansion chamber with fluid during manufacture, wherein the fluid passageway is sealed to prevent fluid exiting the expansion chamber, wherein the fluid passageway opens into the interior of the sleeve.

10. A valve element according to claim 1, further comprising a mounting member coupled to the valve element for mounting the valve element in a valve body.

11. A valve element according to claim 10, wherein the valve element is pivotable with respect to the mounting member.

12. A condensate trap comprising:
   a valve body;
   a valve seat;
   a valve element installed in the valve body and comprising:
      a sealed expansion chamber comprising a first end and an opposing second end along a variable axial length and configured to axially expand or contract in response to a change of the volume of fluid within the sealed expansion chamber, wherein the first and second ends are sealed with first and second end caps respectively;
      a valve closure member on the second end cap for sealing with the valve seat;
      a first guide member coupled to the first end cap and axially extending into the sealed expansion chamber; and
      a second guide member coupled to the second end cap, axially extending into the sealed expansion chamber and cooperating with the first guide member to allow relative axial movement between the first and second end caps but to restrict relative radial movement between the first and second end caps; and
   a mounting member, wherein the valve element is mounted within the valve body by the mounting member, and wherein the valve element is pivotable with respect to the mounting member.

13. A valve assembly comprising:
   a valve body defining a first hollow chamber, having an inlet on a first end and an outlet on an opposing second end along a first axis;
   a valve seat;
   a valve element installed in the valve body and comprising:
      a sealed expansion chamber comprising a first end and an opposing second end defining a variable axial length along the first axis and configured to axially expand or contract in response to a change of the volume of fluid within the sealed expansion chamber, and sealed with first and second end caps, respectively;
      a fluid passageway extending from an outer perimeter of the sealed expansion chamber to an inside perimeter of the sealed expansion chamber configured to permit filling the sealed expansion chamber with a fluid during manufacture, wherein the fluid passageway is further configured to be sealed to prevent the fluid exiting the expansion chamber before use;
      a valve closure member on the second end cap for sealing with the valve seat;
      a first guide member coupled to the first end cap and axially extending into the expansion chamber, wherein upon placement of the sealed expansion chamber in the valve body, the first guide member is parallel and aligned with the inlet of the valve body;
      a second guide member coupled to the second end cap, axially extending into the expansion chamber and cooperating with the first guide member to allow relative axial movement between the first and second end caps but to restrict relative radial movement between the first and second end caps, wherein upon placement of the sealed expansion chamber in the valve body, the second guide member is parallel and aligned with the outlet of the valve body; and a mounting member, wherein the valve element is mounted within the valve body by the mounting member, and wherein the valve element is pivotable with respect to the mounting member;

wherein the volume of the expansion chamber is configured to be reduced in response to a temperature of a collection of condensate in the inlet of the valve body, thereby causing the second guide member and the valve closure member to move axially away from the outlet of the valve body to allow at least a portion of the condensate to flow out of the outlet.

14. The valve assembly of claim 13, wherein the sealed expansion chamber is further configured such that after at least a portion of the condensate flows out of the outlet and a first amount steam enters the valve element, an increase in temperature from the first amount of steam causes an increase in the volume of the sealed expansion chamber, thereby causing the second guide member and the valve closure member to move axially toward the outlet of the valve body to seal the outlet and preventing the first amount of steam from exiting the outlet.

15. The valve assembly of claim 14, wherein the sealed expansion chamber comprises a metal bellows.

16. The valve assembly of claim 15, wherein the metal bellows is preformed from a single piece of material.

17. The valve assembly of claim 14, wherein the first and second guide members comprise a rod and a corresponding sleeve within which the rod is located and can axially slide and wherein the sleeve is coupled to the first end cap and the rod is coupled to the second end cap.

18. The valve assembly of claim 14, wherein the fluid passageway is sealed by a plug fitted into the fluid passageway.

19. The valve assembly of claim 14, wherein the fluid passageway is at least partially sealed using a sealing cap fitted over the end of the fluid passageway.

20. The valve assembly of claim 17, wherein the fluid passageway opens into the interior of the sleeve.

* * * * *